Patented July 21, 1953

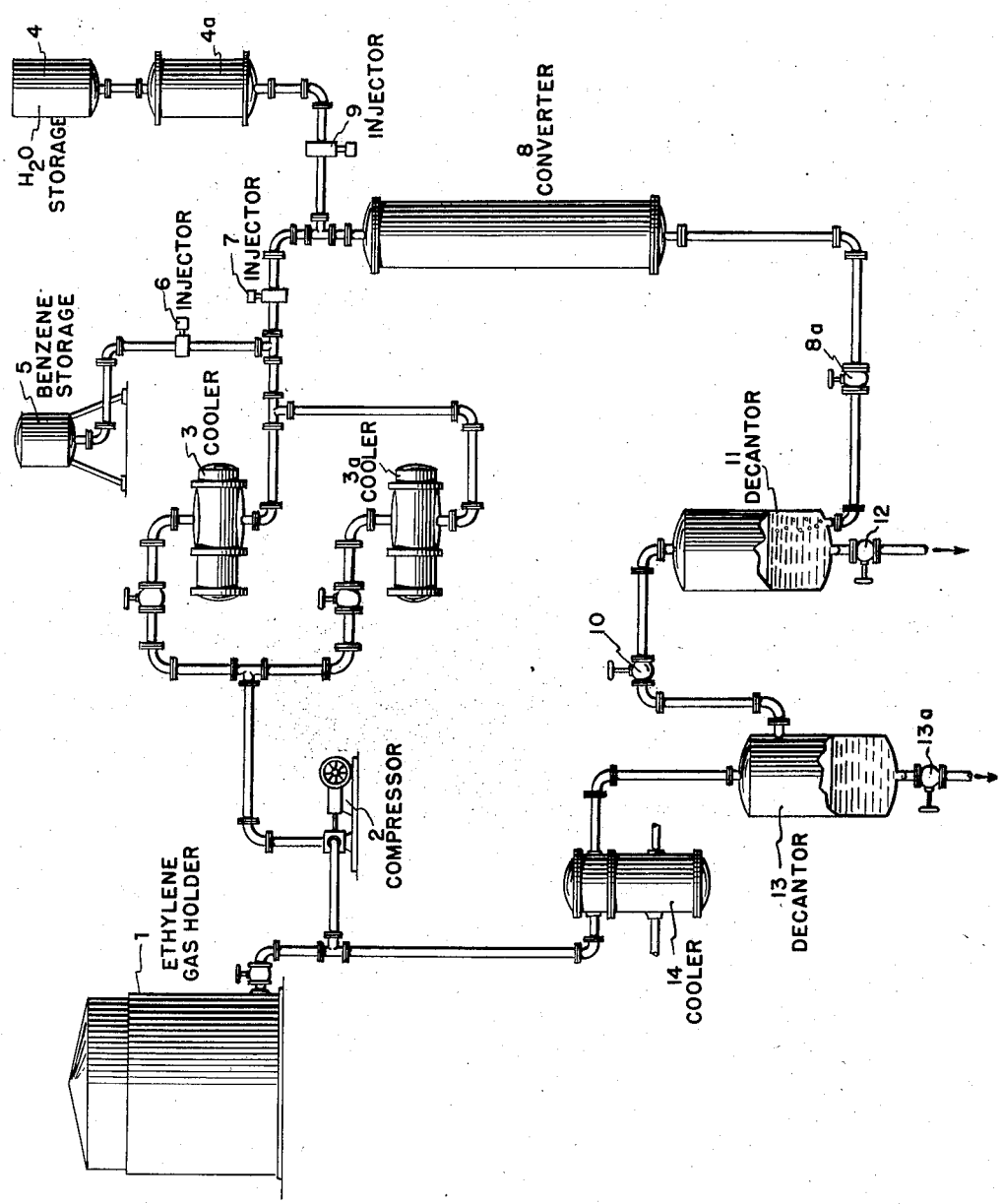

2,646,425

UNITED STATES PATENT OFFICE 2,646,425

PREPARATION OF ETHYLENE POLYMERS

Arthur W. Barry, Wilmington, Del., assignor to E. I. du Pont de Nemours and Company, Wilmington, Del., a corporation of Delaware Application March 23, 1951, Serial No. 217,122

10 Claims. (Cl. 260—94.9)

This invention relates to an improved process for the preparation of high molecular weight products of the olefins and is more particularly related to an improved process for the separation of polymers of ethylene from the reaction mixtures produced by the polymerization of ethylene.

Various methods have been proposed for the polymerization of olefins, such as ethylene, with the principal object of obtaining high molecular weight products for various purposes. Oil-like products of relatively low molecular weight have been prepared from ethylene by its polymerization in the presence of acidic type catalysts while solid to semi-solid high molecular weight products of a polymeric nature have been formed by effecting the polymerization in the absence of catalysts or in the presence of free-radical producing compounds by treatment at pressures above 50 atmospheres and up to 3000 atmospheres or more and at temperatures up to 400° C. The invention of the instant case is principally directed toward products of the latter type.

An object of the present invention is to provide an improved process for the recovery of the products from a process of polymerizing hydrocarbons containing a single ethylenic linkage. Another object is to provide a process for the preparation of high molecular weight polymers from ethylene in the presence of catalysts that decompose under reaction conditions to give free radicals and in which the unreacted ethylene is recycled. A further object is to provide an improved process for the preparation of polymers of ethylene wherein the products are separated by decantation. Other objects and advantages of the invention will hereinafter appear.

In the preparation of high molecular weight polymers of olefinic hydrocarbons containing a single ethylenic linkage and more especially in the polymerization of ethylene whereby high molecular weight polymers are produced in the presence of water and suitable catalysts, the reaction is conducted under very high pressures which may extend up to 4000 atmospheres and above. Reactions of this type are described in the U. S. patents of A. T. Larson, 2,396,920, and A. T. Larson and N. W. Krase, 2,405,962. The products issuing from the reaction zone are under high pressures and it has been found, in accord with the present invention, that efficient and economical operation of the process is effected if the unused reactants and the products of polymerization are separated in at least two stages. In the first stage the products of the reaction are passed into a vessel wherein the water is separated as a lower layer and the polymer and unreacted ethylene as an upper layer. In the second stage the upper layer from the first stage is separated into unreacted ethylene that is recycled and the product, substantially water and ethylene free, recovered as a high density polymer. The pressure may be the same, other than a normal pressure drop, in the stages or different. If they are different it is advisable to have a sufficient pressure in the last stage to maintain the polymer in a fluid state, under the temperature existing, and whereby it can be discharged with facility through a suitable orifice to a receiver maintained at or about atmospheric pressure.

The invention will be more readily understood by reference to the attached drawing where ethylene, from the gas holder 1, which may or may not be a pressure holder, is drawn through compressor 2, wherein it is compressed from gas holder pressure to a pressure between 150 and 500 atmospheres and preferably between 200 and 300 atmospheres, is passed into the cooler 3, primarily for cooling the recycling gases. From the cooler the compressed gases are joined by any addition agents which it may be desired to use, such, for example, as benzene introduced through the storage tank 5 and forced into the ethylene stream by means of the injector 6. The resulting mixture is drawn into the compressor 7 and the pressure increased approximately to conversion pressures, for example to a pressure between 800 and 4000 atmospheres or above. From this compressor the reactants are passed into the converter 8 into which there is simultaneously introduced water from storage tank 4 which is mixed with a catalyst in catalyzer 4a and injected into the converter by means of the injection pump 9. Within the converter the reaction is conducted at a temperature between 40° and 400° C., which temperature is controlled by suitable heating means not shown, the temperature within this range being governed by the type of reaction to be effected, i. e. the lower temperatures are employed for reactions involving the use of benzene, cyclohexane, chlorobenzene and the like and the higher temperatures are generally employed when no addition agents are used. From converter 8 the reaction mixture is passed under substantially the pressure and temperature of the reaction into decanter 11 in which the water separates as a lower layer from the polymer and the unreacted ethylene. From the top of decanter 11 the ethylene polymer and unreacted ethylene pass to decanter 13, there being, if desired, a pressure let-down valve 10 between decanter 11 and 13. The water separated in decanter 11 from the polymer and unreacted ethylene is discharged through pipe 12 to the sewer. The mixture of polymer and unreacted ethylene is separated in decanter 13 into two layers, the lower polymer layer, essentially molten ethylene polymer, being discharged continuously or intermittently from the decanter through let-down valve 13a. From the top of decanter 13 the evolved gases, principally unreacted ethylene, are drawn into compressor 2 for recycing, these gases being cooled prior to their introduction into the compressor in cooler 14.

Two coolers, 3 and 3a, are provided for it has been found that the vapors, when recycled at pressures above 150 atmospheres contain appreciable quantities of the reaction products dissolved in the vapor and it is advisable to condense out these materials prior to passing the olefine gases again into the converter. Moreover, it is generally advisable to lower the temperature of the recycling gases to between approximately 20 and 80° C. prior to their compression to reaction pressures and, accordingly, it is more convenient to use two coolers; as one becomes charged with the product (precipitated by cooling from solution in the gas) it is cut out of the cycle and the other cut in while the first is treated with superheated steam or other means to remove the products contained. By this method it is possible to effect a continuous operation of the process without the necessity of shutting down operation for cleaning out a single cooler.

The reaction as broadly described above, may be carried out in accord with the reaction in any suitable type of converter capable of withstanding the high pressures and it is preferably conducted in one having relatively great length to cross section.

A specific embodiment of the invention resides in the method of separating the polymer and unreacted ethylene from the water whereby a clean separation of the unreacted ethylene from the polymer is insured and removal of water present during the reaction is accomplished without undue loss of products or reacted gases and, another, the polymer is recovered as a high density product.

The operation of the decanters is carried out at the same or different pressures as has been stated, the first decanter preferably being operated, however, under substantially the pressure and temperature conditions of the reaction while the second decanter is operated under a somewhat lower pressure, although with substantially the same temperatures that are present in the first decanter. The first decanter is operated by introduction of the reaction products into the bottom or lower portion whereby the unreacted ethylene and polymer pass up through the water layer which has accumulated in that portion of the decanter. Operation of the process for clean separation is facilitated by providing a sparger or similar device through which the products from the converter pass prior to introduction into the water layer in decanter 11. Operated at substantially the pressure and temperature of the reaction in the absence of any catalyst or free radical, insures that there is substantially no reaction in decanter 11, the polymer with unreacted ethylene being discharged from the top, either as a solution of the polymer in the ethylene gas and/or as slugs of ethylene and polymer. In decanter 13 operation is carried out preferably at a pressure below converter pressure although it is advantageous to operate this vessel at a pressure sufficient to maintain the polymer in the molten state so that it can be readily discharged from the vessel at a sufficiently high temperature under that pressure used to insure substantially complete stripping of the ethylene therefrom. The polymer is discharged from decanter 13 to a vessel not shown, held at substantially atmospheric pressure, the polymeric product, substantially ethylene and water free, being discharged as a high density product. This is in contradistinction to processes heretofore described in the art wherein ethylene has been polymerized in the presence of water for products of those reactions have given polymers of extremely low bulk density which necessitates the use of elaborate drying and working equipment to provide a high density product.

The more specific details of the invention are carried out in accord with the above continuous process for the preparation of olefin polymers and, more especially, polymers of ethylene, by passing the products of the reaction into decanter 11, maintained at a pressure between 5000 and 6000 p. s. i. and at a temperature of approximately 230° C. This pressure is attained by adjustment of the pressure let-down valve 8a. From the bottom of decanter 11 the water layer is discharged through pipe 12 at a rate substantially the same as the rate at which the water accumulates in decanter 11. From the top of decanter 11 the mixture of ethylene and polymer of ethylene is passed through let-down valve 10 into decanter 13, the let-down valve being adjusted to give a pressure in decanter 13 between 1500 and 5000 p. s. i. and a temperature of approximately 230° C. In decanter 13 the molten polymer accumulates in the bottom and is discharged therefrom, according to the shape of the discharge orifice, as a continuous ribbon, bar or other shape of polymer which may be passed into a cooling bath. The polymer may be used in the form produced or cut up, by apparatus not shown, for storage and subsequent use. The ethylene is discharged from the top of decanter 13 and returned at the pressure of that decanter to the system as hereinbefore described.

The pressure under which decanter 11 may operate can range within fairly wide limits, from, for example, 4000 to 10,000 p. s. i. up to substantially the pressure of the polymerization reaction. The second decanter is preferably operated at a lower pressure than the first decanter, but is preferably operated at a pressure above 1500 p. s. i. The temperature in the first decanter is not critical and may be substantially that used during the polymerization reaction while the temperature of the second decanter may be somewhat lower. The sole limiting factor on its minimum temperature is that it should be kept sufficiently high to maintain the polymer therein in a molten state.

The catalyst which may be employed with the reaction includes molecular oxygen or air which may be present with respect to the olefine in amounts ranging from 5 to 2000 p. p. m. (calculated as oxygen). While oxygen may be used as the catalyst, peroxygen-type catalysts may also be used, alone or with oxygen, such catalysts including diethyl peroxide, hydrogen peroxide, persuccinic acid, lauroyl peroxide, tetralin peroxide, urea peroxide, butyryl peroxide, benzoyl peroxide, alkali metal and alkaline earth metal and ammonium persulfates, perborates, percarbonates and the like. Any free radical producing catalyst, such as the azo catalysts and others well known in this art, may likewise be used if desired.

The invention is not limited solely to the polymerization of the aforesaid olefines for it is known that ethylene can be copolymerized with a variety of unsaturated compounds such as propylene, isobutylene, styrene, and similar monoolefinic hydrocarbons, vinyl esters, such as vinyl acetate, vinyl formate, and vinyl isobutyrates, as well as such acids as acrylic, methacrylic, itaconic, crotonic, and fumaric as well as their derivatives such as esters, acid halides, amides and anhydrides. Ethylene will likewise form valuable interpolymers with vinyl halides such as a vinyl chloride and vinylidene chloride; vinyl cyanide and N-vinyl amides, vinyl ethers, divinyl formal, divinyl butyral and methyl vinyl ketone. This olefine will likewise form high molecular weight products in the presence of and with a number of compounds such, for example, as the halogenated hydrocarbons, the saturated aliphatic and aromatic acids, esters, anhydrides, aldehydes, alcohols, ethers, and so forth; and with sulfonyl halides, sulfur halides, and alkyl sulfates. All of these reactions and similar reactions can be conducted in accord with the invention.

I claim:

1. In an improved process for the preparation of high molecular weight ethylene polymers under pressures between 50 and 3000 atmospheres and temperatures up to 400° C. in the presence of a free radical producing catalyst and water, the steps which comprise carrying out the separation of the water from the unreacted ethylene and the polymer in two stages, separating the water from the unreacted ethylene and polymer in the first stage, operating the first stage at substantially the pressure and temperature of the reaction, passing the mixture of unreacted ethylene and polymer from the first stage to a second stage and therein separating the polymer from the ethylene under a pressure and temperature sufficient to maintain the polymer in a molten state and removing from the second stage a relatively high density ethylene polymer substantially ethylene- and water-free.

2. In an improved process for the preparation of high molecular weight ethylene polymers under pressures between 400 and 3000 atmospheres and temperatures up to 400° C. in the presence of a free radical producing catalyst and water, the steps which comprise separating the water, unreacted ethylene and polymer from the reaction mixture in two stages, in the first of which the water is separated from the mixture of ethylene and polymer by decantation at substantially the pressure and temperature of the reaction and in the second of which the polymer and ethylene from the first stage are separated by decantation at a pressure lower than the pressure of the first stage and at a pressure such that the polymer is molten and is discharged substantially free from unreacted ethylene.

3. A process in accord with claim 2 in which the first stage is conducted at a pressure between 5000 and 6000 p. s. i. and at a temperature of approximately 230° C. and the second stage at a pressure between 1500 and 5000 p. s. i. and a temperature of approximately 230° C.

4. In an improved process for the preparation of high molecular weight ethylene polymers under pressures between 400 and 3000 atmospheres and temperatures up to 400° C. in the presence of a free radical producing catalyst and water, the steps which comprise separating the water, unreacted ethylene and polymer from the reaction mixture by two decantations, in the first decantation separating water as a lower layer from the unreacted ethylene and polymer as the upper layer, passing the ethylene and polymer upper layer from the first decantation to the second decantation and in the second decantation separating the mixture of ethylene from the polymer, the reaction mixture of water, unreacted ethylene and polymer being passed into the water layer of the first decantation while discharging as a high density product the polymer from the lower polymer layer of the second decantation.

5. The process of claim 4 in which the first decantation is conducted at a pressure between 4000 and 10,000 p. s. i. and at substantially the reaction temperature and the second decantation is conducted at a pressure below the pressure of the first decantation but at least at a pressure of 1500 p. s. i. both decantations being carried out at a temperature under which the polymer is molten.

6. In an improved process for the preparation of high molecular weight ethylene polymers under pressures between 50 and 3000 atmospheres and temperatures up to 400° C. in the presence of an ethylene polymerization catalyst and a liquid reaction medium, the steps which comprise carrying out the separation of the liquid reaction medium from the unreacted ethylene and the polymer in two stages, separating the liquid reaction medium from the unreacted ethylene and polymer in the first stage, operating the first stage at substantially the pressure and temperature of the reaction, passing the mixture of unreacted ethylene and polymer from the first stage to a second stage and therein separating the polymer from the ethylene under a pressure and a temperature sufficient to maintain the polymer in a liquid state and removing from the second stage a relatively high density ethylene polymer substantially free from ethylene and the liquid reaction medium.

7. The process of claim 6 in which a liquid organic reaction medium is used during the polymerization, said liquid organic reaction medium being separated from the ethylene polymer in the first decantation step.

8. The process in accord with claim 7 in which the liquid organic reaction medium is benzene.

9. The process in accord with claim 7 in which the liquid organic reaction medium is cyclohexane.

10. The process in accord with claim 7 in which the liquid organic reaction medium is chlorobenzene.

ARTHUR W. BARRY.

References Cited in the file of this patent

UNITED STATES PATENTS

| Number | Name | Date |
|---|---|---|
| 2,395,381 | Squires | Feb. 19, 1946 |
| 2,396,791 | Krase et al. | Mar. 19, 1946 |